United States Patent
Dériaz

(10) Patent No.: US 10,072,718 B2
(45) Date of Patent: Sep. 11, 2018

(54) COMPOSITE BRAKE DISC AND METHOD AND APPARATUS FOR MANUFACTURE OF THE SAME

(71) Applicant: Ernst Grob AG, Männedorf (CH)

(72) Inventor: Daniel Dériaz, Meilen (CH)

(73) Assignee: ERNST GROB AG, Mannedorf (CH)

(*) Notice: Subject to any disclaimer, the term of this patent is extended or adjusted under 35 U.S.C. 154(b) by 0 days.

(21) Appl. No.: 15/027,293

(22) PCT Filed: Oct. 22, 2014

(86) PCT No.: PCT/CH2014/000156
§ 371 (c)(1),
(2) Date: Apr. 5, 2016

(87) PCT Pub. No.: WO2015/058314
PCT Pub. Date: Apr. 30, 2015

(65) Prior Publication Data
US 2016/0238095 A1    Aug. 18, 2016

(30) Foreign Application Priority Data

Oct. 23, 2013 (CH) .................................. 1792/13
Dec. 27, 2013 (CH) .................................. 2151/13

(51) Int. Cl.
*B21H 5/00* (2006.01)
*F16D 65/12* (2006.01)
(Continued)

(52) U.S. Cl.
CPC ......... *F16D 65/123* (2013.01); *B21D 39/031* (2013.01); *B21D 53/28* (2013.01);
(Continued)

(58) Field of Classification Search
CPC ...... B21D 22/14; B21D 22/16; B21D 39/031; B21D 39/04; B21D 39/06; B21D 53/265; B21D 53/28; F16D 2065/1356; B21H 5/00
(Continued)

(56) References Cited

U.S. PATENT DOCUMENTS 3,352,138 A * 11/1967 Haug ...................... B21H 5/02
72/402
3,553,809 A * 1/1971 Yamada ................... B21K 1/30
29/523

(Continued)

FOREIGN PATENT DOCUMENTS

CN    103104638    5/2013
DE    198 30 666    1/2000
(Continued)

OTHER PUBLICATIONS

English translation of Chinese Office Action dated Nov. 16, 2017, Application No. 201480058247.7 13 pages.

*Primary Examiner* — Edward Tolan
(74) *Attorney, Agent, or Firm* — Rankin, Hill & Clark LLP

(57) ABSTRACT

With the method for manufacturing a composite brake disc, which includes a brake disc chamber and a friction ring having an inner profiling, a brake disc chamber blank is introduced into the friction ring. The brake disc chamber blank is then formed into the inner profiling via at least one embossing tool. A composite brake disc permitting a good torque transmission between the friction ring and the brake disc chamber can be manufactured in a cold-forming manner in this way. The forming-in can take place in a hammering manner, in particular by successively implementing a plurality of embossing steps in the region of different profile gaps of the inner profiling. Axial stops can also be simultaneously produced on forming-in. The axial stops serve to (Continued)

stop the brake disc chamber and the friction ring (3) are prevented from axially sliding apart.

13 Claims, 4 Drawing Sheets

(51) Int. Cl.
*B21D 53/28* (2006.01)
*B21D 39/03* (2006.01)
B21D 22/14 (2006.01)
*F16D 65/02* (2006.01)

(52) U.S. Cl.
CPC ............... *B21H 5/00* (2013.01); *B21D 22/14* (2013.01); *F16D 2065/136* (2013.01); *F16D 2065/1316* (2013.01); *F16D 2065/1344* (2013.01); *F16D 2065/1356* (2013.01); *F16D 2250/0084* (2013.01)

(58) Field of Classification Search
USPC ...................................................... 188/1.11 L
See application file for complete search history.

(56) References Cited

U.S. PATENT DOCUMENTS

| | | | | |
|---|---|---|---|---|
| 4,955,133 A * | 9/1990 | Tanaka | ................. | B21D 53/261 29/507 |
| 5,568,846 A | 10/1996 | Dagh et al. | | |
| 5,911,459 A * | 6/1999 | Hofmann | ............... | F16C 35/067 29/525 |
| 6,035,978 A | 3/2000 | Metzen et al. | | |
| 6,640,438 B2 * | 11/2003 | Webb | .................... | B23P 11/005 29/407.08 |
| 6,691,789 B2 * | 2/2004 | Jackson | ................ | E21B 43/103 166/207 |
| 6,959,576 B2 * | 11/2005 | Hastings | ................ | B21D 53/28 72/102 |
| 7,076,854 B2 * | 7/2006 | Harms | .................... | F16D 1/072 285/382.4 |
| 7,191,626 B2 * | 3/2007 | Tittmann | ............... | B21H 5/025 72/125 |
| 7,331,206 B2 * | 2/2008 | Aoyama | ................ | B21H 5/025 72/102 |
| 8,117,884 B2 * | 2/2012 | Deriaz | .................. | B21D 53/28 72/370.16 |

FOREIGN PATENT DOCUMENTS

| | | | |
|---|---|---|---|
| DE | 101 25 111 | 12/2002 | |
| DE | 102 06 567 | 9/2003 | |
| DE | 10 2010 055 973 | 4/2012 | |
| EP | 2402625 A1 * | 1/2012 | .......... F16D 65/125 |
| WO | 2010/102704 | 9/2010 | |

* cited by examiner

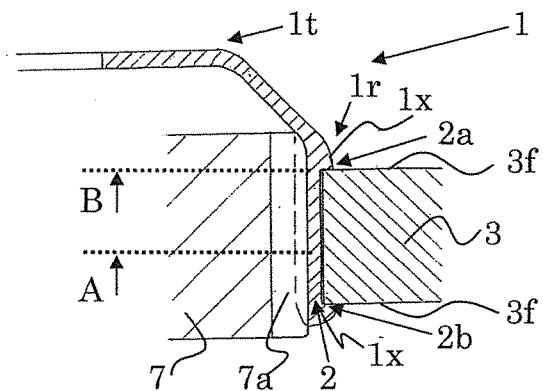
Fig. 5
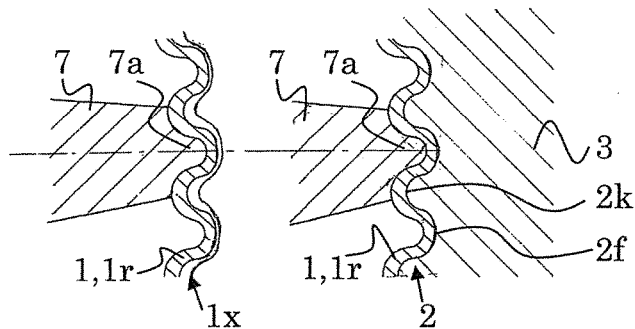
Fig. 5B  Fig. 5A
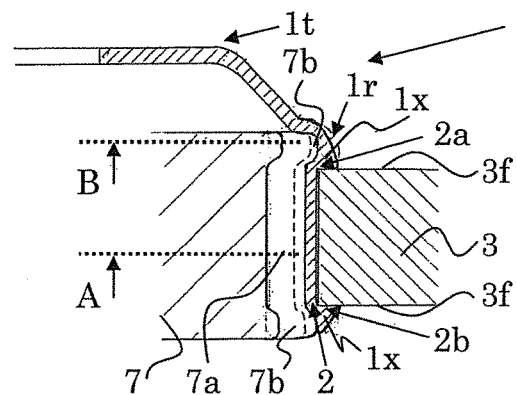
Fig. 6
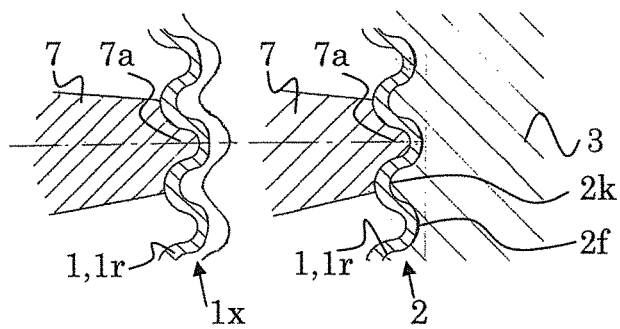
Fig. 6B  Fig. 6A

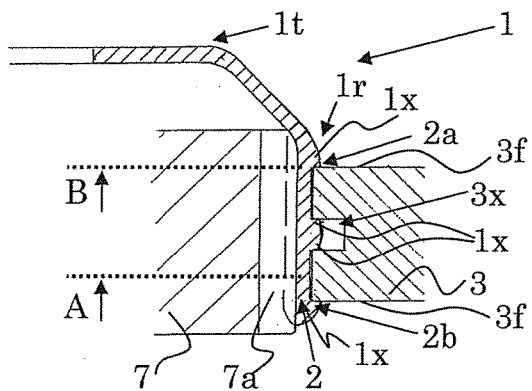
Fig. 7
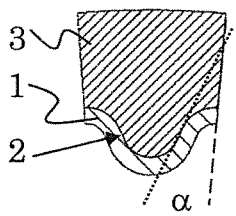
Fig. 7B
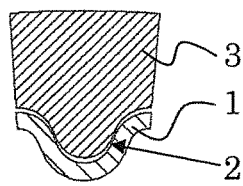
Fig. 7A
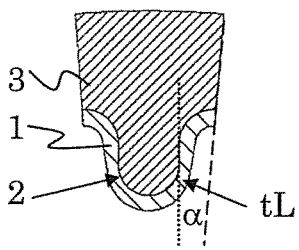
Fig. 8A
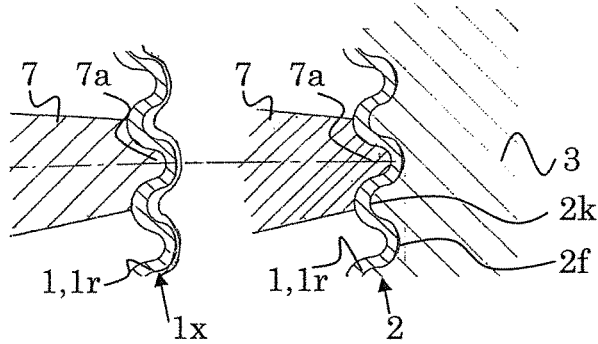
Fig. 8B
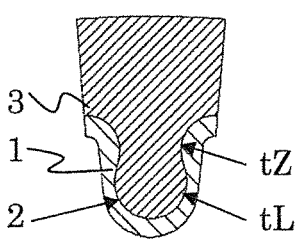
Fig. 9
Fig. 10
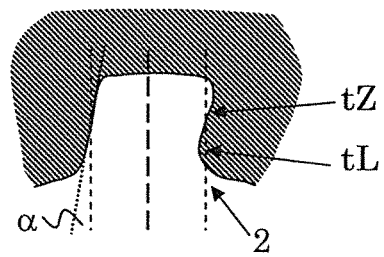
Fig. 11

COMPOSITE BRAKE DISC AND METHOD AND APPARATUS FOR MANUFACTURE OF THE SAME

BACKGROUND OF THE INVENTION

Field of the Invention

The invention relates to brake discs, more precisely to composite brake discs, as well as to methods and apparatuses for the manufacture of composite brake discs. It relates to composite brake discs, apparatuses and methods, according to the preamble of the independent patent claims. Composite brake discs are applied for example in vehicle construction, in particular in motor vehicle construction.

Composite brake discs are increasingly applied, above all in the construction of motor vehicles, since they can have a lower mass than conventional brake discs and because they can be manufactured more economically than conventional brake discs.

A composite brake disc can include a brake disc chamber of sheet metal, in particular of steel sheet metal, and a friction ring of cast iron and even consist essentially of these two parts, as for example is shown in WO 2010/102704 A1.

A brake disc chamber mostly includes a tubular section and a base part connecting thereto or consists of these two parts, wherein a brake disc chamber is mostly designed as one piece.

The friction ring is sometimes also called a brake ring.

A braking moment, which arises on the friction ring with a braking procedure, is transmitted from the friction ring onto the brake disc chamber, e.g. via suitable profilings or toothings in the friction ring and brake disc chamber, more precisely in the tubular section of the brake disc chamber, so that it is also transmitted onto the base part of the brake disc chamber, from where the braking moment can be led onto wheel hubs of vehicles wheels, typically via screw bolts.

It is suggested in the mentioned WO 2010/102704 A1, to create a brake disc chamber provided with an inner toothing and an outer toothing by means of cold-reshaping (cold-forming) and then pressing it into a friction ring, which includes a matching (complementary) inner toothing. A tab which is punched out of the brake disc chamber and is then bent over is provided on the brake disc chamber, for the axial alignment of the friction ring and brake disc chamber.

Moreover, it is known from DE 19830666 A1 to manufacture composite brake discs by means of hydroforming.

SUMMARY OF THE INVENTION

It is the object of the present invention, to provide a new method for manufacturing composite brake discs and corresponding composite brake discs and friction rings, as well as a corresponding apparatus for manufacturing composite brake discs and a use of this apparatus. Moreover, a new method for manufacturing a wheel for a vehicle and also a vehicle provided with a composite brake disc according to the invention are to be provided.

A further object of the invention is to improve the economics of the manufacture of the composite brake disc, wherein in particular, method steps which were otherwise necessary do not need to be carried out and/or a lower number of different processes are to be carried out.

A further object of the invention is to provide composite brake discs with a particularly good run-out.

A further object of the invention is to provide composite brake discs that have a particularly good mutual, axial fastening of the friction ring and brake disc chamber.

A further object of the invention is to provide composite brake discs that have a particularly good mutual rotatory fastening of the friction ring and brake disc chamber, and permit a good torque transmission between these.

A further object of the invention is to provide a method, with which, by means of method parameters, one can select as to whether a play of a mutual rotatory fastening of the friction ring and brake disc chamber is to be present and how large this should be, in particular wherein this is selectable in a reproducible manner.

A further object of the invention is to provide a method, with which, by means of method parameters, one can select as to whether a preload is to be present between the friction ring and the brake disc chamber and how large this is to be, in particular wherein this is selectable in a reproducible manner.

At least one of these objects is achieved at least partly by means of apparatuses, methods and uses, according to the patent claims.

With regard to the method for manufacturing a composite brake disc, which includes a brake disc chamber and a friction ring with an inner profiling, a brake disc chamber blank introduced into the friction ring is formed into the inner profiling by means of at least one embossing tool.

In particular, at least one tubular section of the brake disc chamber blank can be formed into the inner profiling by means of the at least on embossing tool.

A composite element, specifically a composite brake disc can be created in a cold-reshaping (cold-forming) manner, in particular in a non-cutting manner, by means of plastic (and partly also elastic) reshaping of the brake disc chamber blank in this manner. The brake disc chamber arises from the brake disc chamber blank after the completion of the forming-in, and the two previously separate parts—the friction ring and brake disc chamber blank—are fixed on one another, or more precisely: joined into one another.

The composite brake disc mostly essentially consists of the friction ring and the brake disc chamber.

The forming-in normally includes a local reshaping of the brake disc chamber blank in the region of the inner profiling. As the case may be, it can also include a reshaping of the friction ring, or more precisely: of its inner profiling, wherein the reshaping of the friction ring can be very slight, as can typically be the case e.g. of cast iron, or also be significant, as can be typically be the case e.g. of steel, depending on the material of the friction ring.

A rotational fixation/rotational strength between the friction ring and the brake disc chamber can be produced by means of the forming-in. Thus the forming-in has the effect that the brake disc chamber can no longer be rotated with respect to the friction ring in a significant manner (a slight rotatory play can be envisaged), or only by means of a very large force application, in particular only by forces which exceed those forces which can occur with braking procedures. In particular, a multiple wedging between the brake disc chamber and the friction ring arises by means of the forming-in, which is to say by means of the reshaping.

A good torque transmission between the friction ring and the brake disc chamber can be achieved by means of this.

The inner profiling in particular can be a toothing-like inner profiling or an inner-lying tooth profile. The inner profiling can include a multitude of tooth roots and tooth tips. The inner profiling in particular can be an inner toothing, which moreover is typically a spur toothing.

A torque transmission in particular can be effected via teeth of the inner profiling of the friction ring and teeth of the profiling produced in the brake disc chamber.

The forming-in typically takes place over the whole width of the inner profiling, thus over the complete axis-parallel extension of the inner profiling.

The brake disc chamber blank is machined from the inside during the method. The at least one embossing tool machines the brake disc chamber blank from the inside, thus from the side which is away from the friction ring.

Embossing dies are particularly considered as embossing tools.

An embossing tool has an active region, in which it interacts with the brake disc chamber blank when the embossing tool is in engagement with the brake disc chamber blank. This active region can be designed such that the embossing tool only penetrates into a single profile gap or tooth gap of the inner profiling, when it is engaged with the brake disc chamber blank. However, it is also possible to design the embossing tool such that when it is engages with the brake disc chamber blank, it penetrates into several and in particular several adjacent profile gaps or tooth gaps of the inner profiling. For example, the active region could include two radial projections which are axially extended parallel to one another, e.g. for the simultaneous reshaping of the brake disc chamber blank in the regions of two adjacent profile gaps of the inner profiling, so that corresponding projections or teeth of the brake disc chamber can simultaneously form there.

In one embodiment, the method can include the introduction of the brake disc chamber blank (or at least one tubular section of the brake disc chamber blank) into the friction ring. The forming of the brake disc chamber blank (or at least of a tubular section of the brake disc chamber blank) into the inner profiling takes place after the introduction.

The brake disc chamber blank in particular can be introduced into the friction ring without play or with a (slight) press fit.

The forming-in generally takes place by means of one or more embossing steps.

The embossing tool for example can be a profiled mandrel, and the forming-in includes (or is effected essentially by) an insertion of the mandrel into the brake disc chamber blank which is already introduced into the friction ring. A forming of the brake disc chamber blank into the inner profiling in a fully peripheral manner can be achieved in a single step by means of this for example.

The embossing however in particular can also be take place by means of hammering, thus in a hammering manner. This case is explained in more detail hereinafter.

The described method permits the production of a preload between the friction ring and the brake disc chamber, more precisely a preload between the inner profiling (in particular inner toothing) of the friction ring and the (produced in the scope of the method) profiling or toothing of the brake disc chamber. Moreover, positive-fit connections can be produced locally in the region of individual product gaps and, as the case may be, also of individual profile projections (e.g. profile teeth). Details regarding this are described further below. An improved retention, an improved rotation strength and an improved torque transmission between the friction ring and the brake disc chamber result by means of this, also and in particular with procedures with which the friction ring heats up, thus e.g. with braking procedures.

A step for the precision alignment of the rotatory alignments of the friction ring and brake disc chamber blank (or brake disc chamber) before the method or at the beginning of the method can be rendered superfluous. A profiling, in particular toothing, of the brake disc chamber (more precisely: the profiling or the toothing which the brake disc chamber will finally have) is not produced until in the method itself (by forming-in by means of embossing), so that a highly precise rotatory alignment of the profilings/toothings of the friction ring and brake disc chamber results on account of the manufacturing method itself It is further possible to achieve a highly accurate alignment of the axes of the friction ring and brake disc chamber by means of the described method. An excellent run-out can thus be achieved, and specifically, at least generally, without a post-machining such as a post-grinding of the friction ring becoming necessary.

The invention further permits the selection of a rotatory play between the friction ring and the brake disc chamber of the composite brake disc, in particular wherein this play can practically be zero (play-free) or has a selectable magnitude. The method can also permit the production of a (mechanical) preload between the friction ring and the brake disc chamber, as is often desirable for composite brake discs.

Local, positive-fit connections in the region of individual profile gaps and, as the case may be, also of individual profile projections (profile teeth) can be produced given a suitable design of the inner profiling, for example in a waisted manner. Particularly stable fits between the friction ring and the brake disc chamber can be achieved in this manner. Further details with regard to this are described further below.

One can envisage the inner profiling being without edges, in particular in the context of the contour formed by the inner profiling in a cross section perpendicular to the rotation axis having no edges, wherein this is the case at least in all such cross sections in a section parallel to the rotation axis, typically in all such cross sections, in which the inner profiling is formed. Free of edges can thereby be typically understood in that respective radii of curvature are at least 10% of the profile depth of the inner profiling, in particular at least 20% or even at least 25%

A trimming of a brake disc chamber provided with a profiling, before bringing the braking ring and brake disc chamber together, thus a cutting-to-length after profile creation in the tubular section of the brake disc chamber, and which is at least occasionally necessary in the case of methods known from the state of the art, can be done away with in the case of the manufacturing method described here.

With a manner of manufacturing composite brake discs by way of a joining together a friction ring, which is profiled beforehand, and a brake disc chamber, which is profiled beforehand, and which is known from the state of the art, it is often necessary to divide the profiled parts in each case into tolerance classes and then to subsequently form friction ring—brake disc chamber pairs that match one another. Such working steps are superfluous if, as is suggested here, the brake disc chamber is effected by means of forming a brake disc chamber blank into the inner profiling of the brake disk ring.

In one embodiment, the forming-in includes a successive implementation of a plurality of embossing steps in the region of different profile gaps, in particular tooth gaps, of the inner profiling.

The forming-in is thus divided into several part-reshaping steps (in each case by one embossing step). Temporally successive embossing steps can take place at different locations along the periphery of the inner profiling (or along the periphery of the tubular section of the brake disc chamber blank).

The embossing steps are carried out by means of the at least one embossing tool.

It can be sufficient for only a single embossing tool to be used. However, it is also possible for two embossing tools (or even more as the case may be) to be used in the method.

The composite brake disc blank is reshaped in each case in the region of the respective profile gap (or profile gaps) or tooth gap (or tooth gaps), with each of the embossing steps.

One can also envisage the brake disc chamber blank in the region of each profile gap or tooth gap of the inner toothing being reshaped at least once by the at least one embossing tool.

An embossing tool can include two or more active regions (or embossing regions), as already mentioned above, e.g. so that in one embossing step, the brake disc chamber blank is reshaped in the region of two (or more) typically adjacent tooth gaps of the inner toothing, or more precisely, is formed into the inner profiling. On the other hand, it is also (additionally or alternatively) possible to provide several, in particular two embossing tools (each with at least one active region), wherein these machine the brake disc chamber blank either in an alternating manner or simultaneously, e.g. at sides of the brake disc chamber blank that, in particular, lie opposite one another with respect to the axis (radially). The two embossing tools can also be seen as a single embossing tool in the case of an alternating machining, in particular as one having oppositely lying active regions. An at least partial compensation of the forces acting on the friction ring during the embossing steps can take place in the case of the simultaneous machining.

One can envisage the forming-in not including more than precisely one embossing step in the region of each tooth gap of the inner profiling.

In one embodiment, the forming-in includes at least two, in particular at least three embossing steps in the region of each tooth gap of the inner profiling. Also at least four or even more embossing steps can take place per tooth gap of the inner profiling, depending on the type of profiling or toothing (in particular the height of the toothing) and depending on the selection of the materials of the brake disc chamber blank and of the friction ring.

A progressive deepening of the profiling (or toothing) produced in the brake disc chamber blank can be effected in this manner. The forming-in is thus divided into several part-reshaping steps (in each case by one embossing step). A multiple embossing at the same location along the periphery (or the inner toothing or of the tubular part of the brake disc chamber blank) can then take place.

The method can for example be carried out such that a deeper and deeper formation of a profiling of the brake disc chamber blank is produced in a plurality of revolutions of the workpiece (which is formed by the friction ring and the introduced brake disc chamber blank or in a more narrow sense, by the brake disc chamber blank) by means of the periodic machining of the workpiece by means of the embossing tools, until a predefined profiling depth and shape or toothing depth and shape, of the brake disc chamber is achieved.

One can envisage the brake disc chamber blank in the region of each profile gap or tooth gap of the inner toothing being reshaped at least twice or at least thrice, by the at least one embossing tool.

One and the same, or also two or more different ones of the embossing tools can be applied for the mentioned two or more embossing steps, for each tooth gap.

In one embodiment, the friction ring together with the introduced brake disc chamber blank carries out a rotation movement with a temporally varying rotation speed, about a rotation axis of the composite brake disc, and the at least one embossing tool executes radially oscillating movements which are synchronised with the mentioned rotation movement, so that the at least one embossing tool repeatedly, in particularly periodically machines the brake disc chamber blank.

The term "radially" is defined by the rotation axis. The rotation axis of the composite brake disc is of course given by the later use of the composite brake disc and thus is given by the rotation axis of the rotating object to be braked, typically a vehicle wheel, but it can also be defined by the inner profiling, in particular inner toothing, of the friction ring, e.g. as the axis, which extends centrally through the inner profiling or inner toothing.

A rapid forming of the brake disc chamber blank into the inner profiling can be achieved in this manner, and this being the case with an even greater precision.

Thereby, one can further envisage the at least one embossing tool machining the brake disc chamber blank in those phases of the rotation movement, in which the friction ring and introduced brake disc chamber blank are at least momentarily at a standstill, wherein the at least one embossing tool machines the brake disc chamber blank in phases of the rotation standstill of the friction ring and inserted brake disc chamber blank.

The forming-in can be effected with a very high precision in this manner.

The rotation movement in particular can be an intermittent rotation. A rotation standstill exists again and again, typically periodically, during a generally selectable time duration, in the case of an intermittent rotation.

The forming-in can be effected with a particularly high precision in this manner, but the total machining duration increases slightly due to the standstill times.

The brake disc chamber blank generally includes a tubular section and a base part which connects thereto, in particular wherein the tubular section is designed with the base part as one piece.

In one embodiment, the brake disc chamber blank is non-profiled, in particular non-toothed, before introduction into the friction ring. This relates to the tubular section, into which a profiling is then incorporated in the course of the method.

Thus no profiling or toothing (and no pre-profiling or pre-toothing) is present in the brake disc chamber blank or at least in its tubular section, at least not to the extent that it would match with the inner toothing, before the introduction into the friction ring.

The brake disc chamber blank or at least its tubular section can thus be designed in an essentially rotationally symmetrical manner, in particular shaped in a cylindrical manner (before the introduction into the friction ring).

Alternatively, one could also envisage the brake disc chamber blank being pre-profiled or being provided with a pre-toothing.

The case without (pre-)profiling/(pre-)toothing renders a rotatory alignment of the friction ring and brake disc chamber blank to one another before the introduction superfluous and saves the production of the (pre-)profiling/(pre-)toothing.

In one embodiment, the inner profiling includes profile gaps, which are waisted and/or are each delimited by at least one such profile flank, including a section or a location, where its runs parallel within 10°, in particular within 5°, to a radial axis running centrally through the respective profile gap. Further details with regard to inner profilings designed in such a manner are described further below.

In one embodiment, at least one outwardly directed projection is formed on the brake disc chamber for the mutual axial fixation of the friction ring and the brake disc chamber, by means of the at least one embossing tool during the forming-in. In particular, one can envisage several outwardly directed projections being formed on the brake disc chamber for the mutual axial fixation of the friction ring and brake disc chamber, by means of the at least one embossing tool during the forming-in.

Such projections can also be indicated as axial stops or axial abutments.

"Outwardly" here more specifically means that the projections extend away from the rotation axis in the radial direction.

The projections can project radially outwards and in particular can radially project beyond those regions of the brake disc chamber, in which the brake disc chamber is formed into the inner toothing.

The mentioned projections can be bulges. This is then typically due to their manner of production.

A sliding-apart of the brake disc chamber and the friction ring can be prevented, or an axial play between the brake disc chamber and the friction ring limited or minimised, by the projections. The projections can act as an axial stop.

This can be advantageous, in particular with single-sided, axial loading of the composite brake disc or with heating and an expansion of the friction ring resulting therefrom, which is the case with braking procedures.

In particular, one can envisage the at least one projection being designed such that the brake disc chamber is held on the friction ring axially without play or even with an axial preload. A suitable selection of method parameters can permit this. For example, the friction ring can be held axially free of play or with an axial preload, between two such projections.

A single projection can already have the mentioned effect. For example, this projection can be designed in a ring-like or annular manner and in particular cooperate with a groove in the friction ring. In another example, two ring-like or annular projections can be formed, wherein each of the two interact with an end-face of the friction ring which delimits the inner profiling.

In one embodiment, the at least one projection is produced by way of reshaping the brake disc chamber blank, which is effected by means of embossing steps, by means of which also, typically simultaneously, a reshaping of the brake disc chamber blank is effected for achieving the forming-in.

Thus a simultaneous forming into the inner profiling (more precisely: in tooth gaps of the inner profiling) and production of the projection or projections can be achieved.

The same embossing tool can be used for the forming-in (of the brake disc chamber blank) and for the production of the at least one projection.

Notably, one can succeed in the forming of the brake disc chamber blank into the inner profiling and also the production of the at least one projection, in particular for an axial fixation, being effected in the same embossing steps.

No separate manufacturing steps then need to be provided for the provision of an axial fixation (of the friction ring and the brake disc chamber blank). Thus special working steps for creating an axial fixation can then be done away with, in comparison to certain methods known from the state of the art.

In one embodiment, projections are formed at the axial ends of the inner profiling. In particular, at least two projections can be formed, wherein at least one of the projections is formed at an axial end of the inner profiling and at least one other of the projections is formed at another end of the inner profiling.

In this case, one generally envisages the brake disc chamber blank extending at both sides in the axial direction beyond the axial extension of the inner profiling in a projecting manner, after introduction into the friction ring. Furthermore, in this case one very generally envisages the at least one embossing tool, more precisely the active region or the active regions of the at least one embossing tool extending beyond the axial extension of the inner profiling in a projecting manner—at least during the embossing steps.

It is also possible for a projection or several projections to alternatively or additionally be formed on surfaces or grooves or recesses of the friction ring, which lie between the axial ends of the inner profiling, or on at least one such surface, at least one such groove, at least one such recess.

The surfaces or grooves or recesses of the friction ring are thereby typically adjacent the inner profiling.

The mentioned surfaces or also walls of the mentioned grooves or recesses can be aligned parallel to a plane perpendicular to the axis, or have this alignment within ±40° or rather within ±25°. A good axial fixation can be achieved by means of this, in particular if a right angle or acute angle is formed on the mentioned surfaces or walls.

Further possible details regarding the at least one projection, the at least one axial fixation are described further below, in particular with regard to the composite brake disc.

One mostly envisages the outer diameter of the brake disc chamber blank (more precisely: of the tubular section) being smaller than an outer diameter of the inner profiling or, in the case of an inner toothing as an inner profiling, being smaller that a root diameter of the inner toothing, before the introduction into the friction ring.

Generally, the outer diameter of the brake disc chamber blank (more precisely: of the tubular section) can moreover be greater or the same or smaller than an inner diameter of the inner profiling or, in the case of an inner toothing as an inner profiling, than a tip diameter of the inner toothing.

In particular, the outer diameter can be in the region of between 2 mm more and 2 mm less than the tip diameter of the inner toothing. One can envisage the outer diameter of the brake disc chamber blank (more precisely: of the tubular section) being (locally) reduced by means of chamfering at the end that is away from the base part, before or on introduction into the friction ring, for simplifying the introduction. A further possibility, by means of which the introduction of the brake disc chamber blank into the friction ring can be simplified, lies in providing a (slightly) conically designed tubular section. The outer diameter of the brake disc chamber blank can thus taper, in particular in the direction towards the base part or alternatively in the direction away from the base part. For example, one can envisage the outer diameter of the tubular section reducing, in particular continuously reducing, for example by between 0.05% and 5% of the outer diameter or typically by between 0.1% and 2% of the outer diameter, or by between 0.05 mm and 10 mm or typically between 0.2 mm and 3 mm, over that (axial) region, in which the tubular section is formed into the inner profiling.

A deformation of the brake disc chamber blank can generally be avoided on introduction, if the outer diameter of the brake disc chamber blank is smaller than an inner diameter of the inner profiling or, in the case of an inner toothing as an inner profiling, than a tip diameter of the inner toothing.

A deformation or reshaping of the brake disc chamber blank takes place when forming in, if in contrast the outer diameter of the brake disc chamber blank is larger than an inner diameter of the inner profiling, or, in the case of an inner toothing as an inner profiling, than a tip diameter of the inner toothing. The chamfering mentioned above can e.g. be envisaged, in order to simplify the introduction in such a case. The brake disc chamber blank and the friction ring are then fastened on one another—even if only to a lesser extent than is the case after completion of the method—already after the introduction (and before a first embossing step).

The following dimensions and dimension ranges (which can also be combined) make particularly sense in the context of the invention:

a. inner diameter of the inner profiling: 20 mm to 2000 mm, in particular 50 mm to 800 mm;
b. profile depth of the inner profiling: 0.5 mm to 25 mm, in particular 0.8 mm to 10 mm;
c. axial length of the inner profiling or toothed length: 2 mm to 400 mm, in particular 10 mm to 50 mm.

The apparatus for manufacturing a composite brake disc, which includes a brake disc chamber with a tubular section, as well as a friction ring comprising an inner profiling, can be used to create the brake disc chamber by way of reshaping a brake disc chamber blank (in particular by way of forming this into the inner profiling of the friction ring). The apparatus comprises:

a. a workpiece holder rotatable about its longitudinal axis, for holding the friction ring, into which the brake disc chamber blank is introduced, so that the tubular section is located within the inner profiling, in a manner such that the tubular section can be machined on its inner side;
b. a drive for the rotation of the workpiece holder, which is designed for producing a rotation with a temporally varying rotation speed, in particular an intermittent rotation;
c. a tool holder for holding at least one embossing tool, the tool holder being drivable for carrying out a linearly oscillating movement running radially to the longitudinal axis, so that the tubular section on its inner side can be repeatedly, in particular periodically machined by means of the at least one embossing tool;
d. a synchronisation device for synchronising a rotation of the workpiece holder, which is producible by means of the drive, with the linearly oscillating movement of the tool holder, which runs radially to the longitudinal axis.

Composite brake discs can be manufactured in a very efficient and precise manner by means of the machine, in particular by means of the described (typically hammering) manufacturing method.

The axis of the friction ring, which can be defined e.g. by the inner profiling, is thereby generally aligned along the longitudinal axis.

The axis of the brake disc chamber blank is also thereby aligned generally along the longitudinal axis.

The rotation axis of the composite brake disc is thereby aligned generally along the longitudinal axis.

A drive for the oscillating movement can be envisaged (tool holder drive), wherein this (completely or partly) can be identical to or (completely or partly) different from the drive for the rotation of the workpiece holder. The synchronisation device can be a part of the drive in this case.

The tool holder drive can include an eccentric or crank for example.

The workpiece holder for example can include a friction ring holder and a brake disc chamber blank holder, which in particular can be actively connected to one another for maintaining the mutual positioning of the friction ring and brake disc chamber blank.

The synchronisation device for example can synchronise in a mechanical manner or, rather, in an electronic manner.

In one embodiment, the apparatus includes a position-determining unit for determining a relative rotatory positioning of the friction ring and the tool holder, or of the friction ring and embossing tool.

This can serve for the relative rotatory positioning of the friction ring and the at least one embossing tool.

The apparatus can include the at least one embossing tool.

A rotationally precise alignment of the friction ring and tool holder (and/or embossing tool) to one another can be made possible with the help of the position-determining unit (or at least by means of data or signals which the position-determining unit can output).

A rotatory position of the friction ring (and thus then also of the workpiece holder holding the friction ring) relative to a reference can be determined for example, the reference in turn being positioned rotatorily relative to the tool holder (or to the embossing tool) in a fixed or known manner, or also the position of the tool holder or that of the at least one embossing tool is likewise determined relative to the reference (or to a further reference).

The position-determining unit for example can include an optical or mechanical sensor for determining the rotatory alignment of the friction ring and/or of the embossing tool or of the tool holder. The sensor for example can orientate itself on the inner profiling of the friction ring, e.g. the sensor can determine the rotatory position of at least one tooth or at least one tooth gap of the inner profiling, and/or the sensor can orientate itself for example on the (at least one) active region of the at least one embossing tool.

A precise rotatory positioning of the embossing tool and inner profiling permits a precise forming of the brake disc chamber blank into the friction ring. An engagement of the at least one embossing tool (with its at least one active region) centrally to profile gaps/tooth gaps can be ensured in this manner.

In one embodiment, the apparatus includes an introduction device for introducing the brake disc chamber blank into the friction ring.

The introduction device for example can include two holding devices, one for the brake disk chamber blank, the other for the friction ring, wherein both have a common middle axis and the one holding device is movable relative to the other holding device along the middle axis. This middle axis typically corresponds to the rotation axis of the composite brake disc.

The two holding devices can be moved relative to one another along the middle axis manually or by means of a drive. Thus the brake disc chamber blank can be centrally introduced centrally into the friction ring, in particular in an automated manner or one that is able to be automated.

The introduction device can for example include a robot.

A device for producing a radial advance of the tool holder can also be provided. A (radial) feed movement of the tool holder and thus of the embossing tool can be produced by means of this.

The use is a use of an apparatus of the described type for manufacturing a composite brake disc. The composite brake disc thereby is mostly essentially created from a brake disc chamber blank and a friction ring.

One can also consider the use as a use of the apparatus of the described type for fastening a brake disc chamber and a friction ring of a composite brake disc onto one another.

The friction ring (for a good fit between the friction ring and the brake disc chamber) has an inner profiling which includes the profile gaps which are waisted and/or are delimited in each case by at least one such a profile flank which has a section or a location where, within 10°, in particular within 5°, it runs parallel to a radial axis running centrally through the respective profile flank.

The angles thereby in particular relate to the angles to the respective (local) tangents to the profile flank (in the plane which is aligned perpendicularly to the rotation axis).

Typically, at least three such profile gaps are provided, and in particular also all profile gaps of the inner profiling are designed in the mentioned manner.

Moreover, the two profile flanks of corresponding profile gaps can be designed in the mentioned manner.

Both profile flanks of a corresponding profile gap can have the same (even if mirrored) contour (symmetrical profile gap). However, also other cases (non-symmetrical profile gaps) can be provided. Accordingly, the mentioned waist can be designed in a symmetrical or asymmetrical manner.

The term "radial axis" describes an axis through a rotation axis of the composite brake disc that lies in a plane aligned perpendicularly to this rotation axis.

In the case of symmetrical profile gaps, the radial axis running centrally through the respective profile gap is equal to the symmetry axis. In the general case, which also includes non-symmetrical profile gaps, the radial axis running centrally through the respective profile gap is that radial axis by means of which the area, which is described by the profile gap in the plane perpendicular to the rotation axis, is halved into two halves of equal area content.

Moreover, the inner profiling can include profile projections (for example profile teeth), which are waisted and/or which are delimited in each case by at least one such profile flank, which includes a section or a location where it runs parallel within 10°, in particular within 5°, to a radial axis running centrally through the respective profile flank.

In this case, with regard to context, the same further special embodiments can be provided, as described above for the correspondingly designed profile gap. The fit and behaviour can be particularly favourable in this case, given a heated friction ring.

In a first aspect of the composite brake disc, this includes the described friction ring as well as a brake disc chamber, wherein the brake disc chamber is formed into the inner profiling of the friction ring.

In a second aspect of the composite brake disc, this includes a brake disc chamber as well as a friction ring, which has an inner profiling, into which the brake disc chamber is formed, wherein the brake disc chamber includes at least one outwardly directed projection for the mutual axial fixation of the friction ring and brake disc chamber.

In one embodiment, the projection or projections each include at least one region, in which it or they have a shape as can arise by way of a free material flow.

In one embodiment, the shape, which the projection or projections have in the respective at least one region, has arisen by way of free material flow.

The projections are bulge-like or bulge-shaped in one embodiment.

In one embodiment, a structure, which is present in a continuous manner or in sections along a ring, is formed by the at least one projection. This structure, in particular can be formed by the projections, at a multitude of locations along the ring, in the case of the structure present in sections along the ring.

In one embodiment, a line is reproduced by the structure, the line being described by the shape of the inner toothing at an end-face of the friction ring, in particular where the end-face is an end-face delimiting the inner profiling. Thereby, this reproduction in particular can be of such a nature that the structure is displaced radially outwards with respect to the mentioned line. The magnitude of the displacement thereby, as the case may be, can be dependent on the respective local radius of the inner profiling (on a respective end-face on the profiled region of the friction ring). The projection for example in the region of tooth gaps of the inner profiling can project further (or alternatively to a lesser extent) radially outwards than in the region of teeth of the inner profiling, in the case of a continuous structure. Or projections in the region of tooth gaps (or alternative in the region of teeth) of the inner profiling can project radially outwards to a greater extent than in the region of tooth flanks of the inner profiling, in the case of a structure present in sections along the ring.

A structure present in sections along the ring in particular can be formed by a plurality, e.g. at least 4 or at least 20, of projections distributed uniformly over the periphery of the inner profiling.

A structure, which is present in sections along the ring in particular, can be formed by precisely as many projections as the inner profiling has profile gaps or tooth gaps or teeth.

One can envisage projections being present in the region of each tooth gap of the inner profiling and/or projections being present in the region of each tooth tip of the inner profiling.

One can envisage at least one of the projections extending in a ring-like manner or continuously over the complete periphery of the friction ring. For example, it can have a meandering shape along a ring. In particular, one can envisage not more than precisely two such projections being present. Thereby, the one projection for example then prevents the brake disc chamber from sliding out of the friction ring in the one axial direction, and the other projection preventing a sliding of the brake disc chamber out of the friction ring in the opposite axial direction.

For example, one can envisage a first plurality of projections being provided on a first end-face of the friction ring, and a second plurality of projections being present on a second end-face of the friction ring, in the case of structures present in sections along a ring, so that the first plurality of projections prevents a sliding of the brake disc chamber out of the friction ring in one axial direction, and the second plurality of projections prevents a sliding of the brake disc chamber out of the friction ring in the opposite axial direction.

The friction ring can be encompassed in sections or continuously along its periphery by the brake disc chamber (with the projections), at end-faces close to the inner profiling, by means of the projections.

At least one projection of the brake disc chamber that is formed on surfaces or grooves or recesses, which are provided between the end-faces, can be provided additionally or alternatively to projections on end-faces of the friction ring close to the inner profiling. The at least one projection, analogously to that which has been described above, can form a structure present in a continuous manner or in sections along a ring, in the case of surfaces or grooves or recesses, which are continuously present along the periphery of the inner profiling. One or two projections can be present per surface or groove or recess in the case of surfaces or grooves or recesses, which are distributed over the periphery of the inner profiling in a non-continuous manner.

The at least one projections can be integrally formed onto the mentioned surfaces or grooves or recesses or also onto the end-faces of the friction ring which delimit the inner profiling.

A region, in which the at least one projection is integrally formed in the mentioned manner can typically be adjacent a region, in which the shape of the at least one projections has arisen by way of a free material flow.

Further embodiments for the composite brake disc are to be deduced from the described composite brake disc manufacturing methods.

The method for manufacturing a wheel for a vehicle, wherein the wheel includes a composite brake disc, is characterised in that the composite brake disc is manufactured by the described composite brake disc manufacturing method, or that the described composite brake disc or the described friction ring is used in the manufacturing method.

A vehicle according to the invention includes a composite brake disc of the described type or a composite brake disc that is manufactured by the described composite brake disc manufacturing method, or a composite brake disc which includes the described friction ring.

The vehicle can in particular be a motor vehicle, for example an automobile, motorbike or a motorised bike. The vehicle can also be a motor-less vehicle.

In a generalised view with regard to the invention, this is not limited to composite brake discs or their manufacture. In contrast, within this generalised view, instead of relating to the friction ring merely given by example, it relates to an outer part, e.g. an outer ring, which is provided with an inner profiling (or inner toothing), and instead of merely relating to the brake disc chamber (and brake disc chamber blank) given by way of example, it relates to an inner part (and an inner part blank) with a tubular section, wherein the inner part blank and the outer part are fastened on one another or are connected to one another or said differently, wherein a composite part is created, which includes the inner part and the outer part.

The generalised method in particular can be described as a method for manufacturing a composite part comprising an inner part having a tubular section, and an outer part, e.g. an outer ring, having an inner profiling, in particular an inner toothing, wherein an inner part blank, or more precisely a tubular section of the inner part blank, which is introduced into the outer part is formed into the inner profiling by means of at least one embossing tool.

From a different point of view, one can see the method also as a method for the connection, in particular permanent connection of an inner part having a tubular section, to an outer part, e.g. outer ring, which has an inner profiling, in particular an inner toothing, wherein a inner part blank, or more precisely a tubular section of the inner part blank, which is introduced into the outer part, is formed into the inner profiling by means of at least one embossing tool.

More specialised embodiments of the generalised method are to be deduced from the embodiments described for the special case of the composite brake disc.

The generalised apparatus in particular can be described as an apparatus for manufacturing a composite component which includes an inner part having a tubular section and an outer part having an inner profiling, wherein the inner part is producible by reshaping an inner part blank by means of the apparatus, and the inner part blank includes a tubular section, wherein the apparatus includes:

a. a workpiece holder rotatable about its longitudinal axis, for holding the outer part, into which the inner part is introduced, so that the tubular section is located within the inner profiling, in a manner such that the tubular section can be machined on its inner side;

b. a drive for the rotation of the workpiece holder, the drive being designed for producing a rotation with a temporally varying rotation speed, in particular an intermittent rotation;

c. a tool holder for holding at least one embossing tool, the tool holder being drivable for carrying out a linearly oscillating movement running radially to the longitudinal axis, so that the tubular section at its inner side can be repeatedly, in particular periodically machined by means of the at least one embossing tool;

d. a synchronisation device for synchronising a rotation of the workpiece holder, which can be produced by means of the drive, with the linearly oscillating movement of the tool holder which runs radially to the longitudinal axis.

From another point of view, the apparatus in particular can also be described as an apparatus for the connection, in particular for the permanent connection of an inner part having a tubular section, to an outer part, e.g. outer ring, which has an inner profiling, in particular an inner toothing, wherein the inner part cis producible by reshaping an inner part blank by means of the apparatus, and the inner part blank has a tubular section, wherein the apparatus includes the constituents mentioned above (workpiece holder, drive for the rotation of the workpiece holder, tool holder, synchronisation device).

More special embodiments of the generalised apparatuses are to be deduced from the embodiments described for the special case of the composite brake disc.

The generalised use in particular can be a use of the described generalised apparatus for manufacturing a composite part or, from another point of view, a use of the described generalised apparatus from a different point of view for the connection, in particular for the permanent connection of an inner part having a tubular section, to an outer part, e.g. outer ring, which has an inner profiling, in particular an inner toothing.

More special embodiments of the generalised uses are to be deduced from the embodiments described for the special case of the composite brake disc.

From a general view of the invention, the composite part can be described as a composite part comprising an inner part and an outer part which includes an inner profiling, in particular inner toothing, into which the inner part is formed, wherein the inner part includes outwardly directed projections for the mutual, axial fixation of the outer part and inner part, in particular wherein the projections each have at least one region, in which they have a shape as can arise by way of a free material flow.

The inner part blank and the inner part can also be pot-like in the generalised viewpoint, and in particular they can be formed of metal sheet, e.g. of steel sheet metal, at least in a tubular section which is to be formed in (reshaped). The outer part in particular can be metallic.

BRIEF DESCRIPTION OF THE DRAWINGS

The subject-matter of the invention is hereinafter explained by way of embodiment examples and the accompanying drawings. In a schematic manner, there are shown in:

FIG. 5 is an illustration of a detail of the apparatus at the end of the method, in an axis-parallel section;

FIG. 5A is an illustration of a detail of the apparatus of FIG. 5, in a section perpendicular to the axis, in FIG. 5 characterised by the arrow and "A";

FIG. 5B is an illustration of a detail of the apparatus of FIG. 5, in a section perpendicular to the axis, in FIG. 5 characterised by the arrow and "B";

FIG. 6 is an illustration of a detail of the apparatus at the end of the method, with an embossing tool and projections, in an axis-parallel section;

FIG. 6A is an illustration of a detail of the apparatus of FIG. 6, in a section perpendicular to the axis, in FIG. 6 characterised by arrow and "A";

FIG. 6B is an illustration of a detail of the apparatus of FIG. 6, in a section perpendicular to the axis, in FIG. 6 characterised the arrow and "B";

FIG. 7 is an illustration of a detail of the apparatus at the end of the method, with a groove or recess in the friction ring, in an axis-parallel section;

FIG. 7A is an illustration of a detail of the apparatus of FIG. 7, in a section perpendicular to the axis, in FIG. 7 characterised by the arrow and "A";

FIG. 7B is an illustration of a detail of the apparatus of FIG. 7, in a section perpendicular to the axis, in FIG. 7 characterised by arrow and "B";

FIG. 8A is an illustration of a detail of a friction ring with a formed-in brake disc chamber, in a section perpendicular to the axis;

FIG. 8B is a principle illustration of the detail according to FIG. 8A, with a heated friction ring;

FIG. 9 is an illustration of a detail of a friction ring with a formed-in brake disc chamber, in a section perpendicular to the axis;

FIG. 10 is an illustration of the detail of a friction ring with a formed-in brake disc chamber with a waisted gap, in a section perpendicular to the axis;

FIG. 11 is an illustration of a detail of a friction ring with an asymmetrical profile gap, in a section perpendicular to the axis.

DETAILED DESCRIPTION OF THE INVENTION

Parts that are not essential for understanding the invention to some extent are not illustrated. The described embodiment examples represent the subject-matter of the invention by way of example and have no limiting effect.

Figure 1:
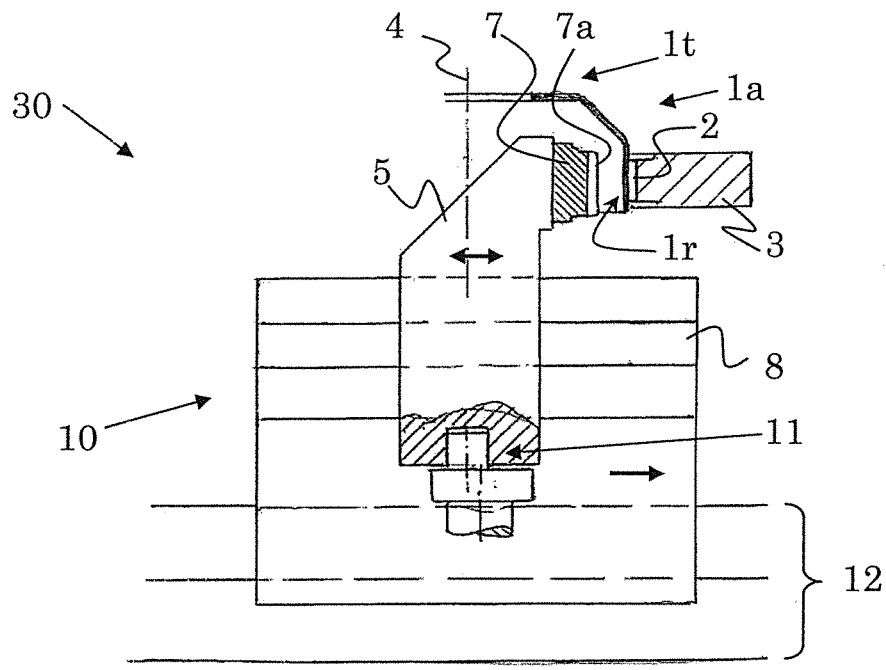
FIG. 1 is an illustration of a detail of the apparatus at the beginning of the forming-in process, in an axis-parallel section.
Figure 2:
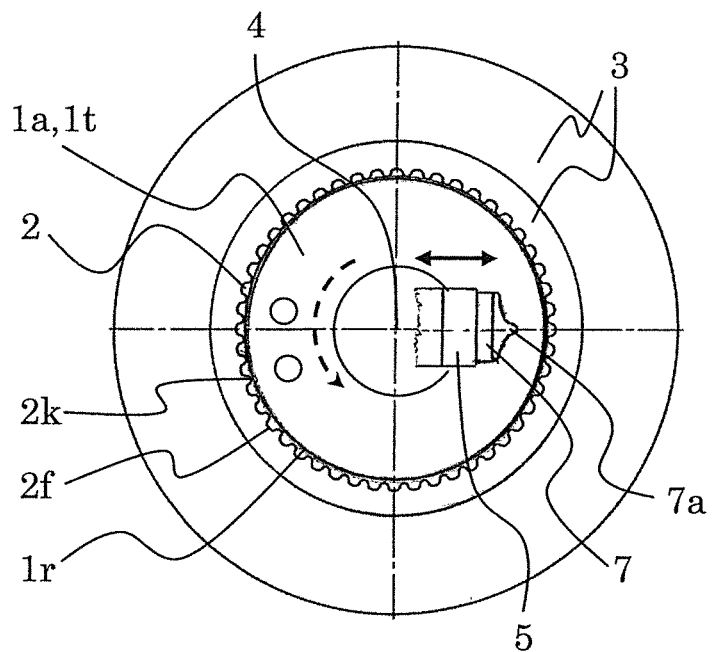
FIG. 2 is an illustration of the friction ring and brake disc chamber blank of FIG. 1, in a section perpendicular to the axis.

FIG. 1 in a schematic manner illustrates details of the apparatus 30 for manufacturing a composite brake disc with a friction ring 3 and a brake disc chamber, in a section parallel to an axis 4. FIG. 2 in a schematic manner illustrates the friction ring 3 and the brake disc chamber blank 1a of FIG. 1, in a section perpendicular to the axis 4.

Figure 3:
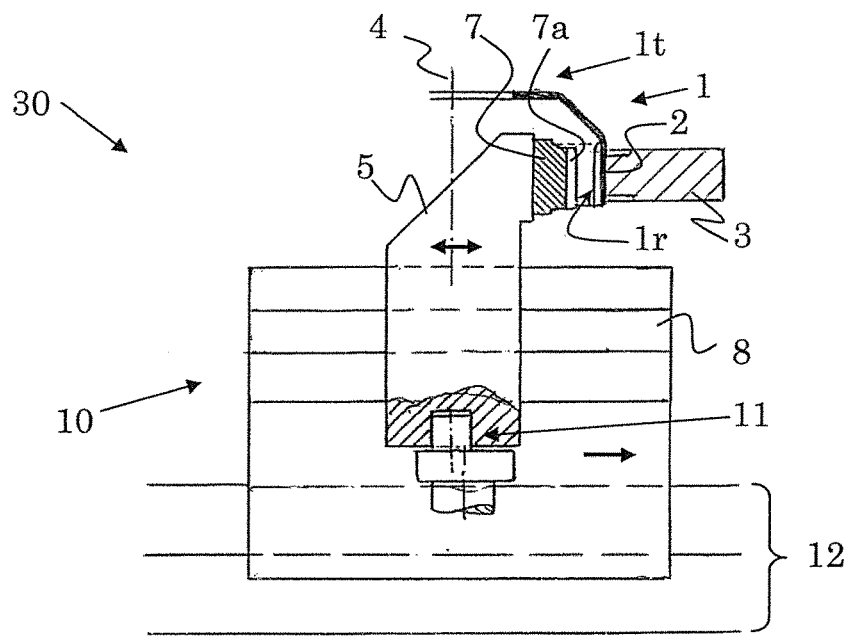
FIG. 3 is an illustration of a detail of the apparatus of FIG. 1, but at the end of the forming-in process, in a section parallel to the axis.
Figure 4:
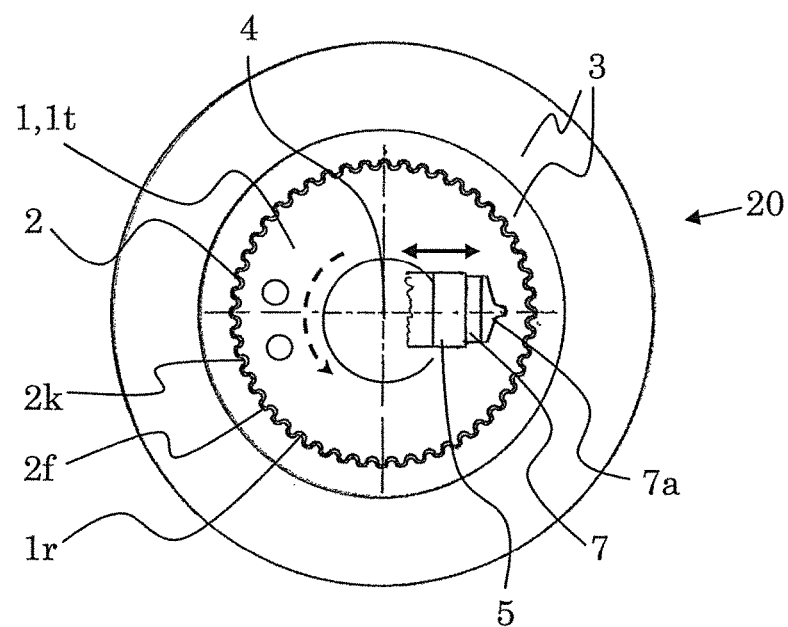
FIG. 4 is an illustration of the friction ring and the brake disc chamber of FIG. 3, in a section perpendicular to the axis.

FIGS. 1 and 2 illustrate the condition at the beginning of the forming-in process, thus in a condition, in which the brake disc chamber blank is not yet reshaped by the embossing tool, whereas FIGS. 3 and 4 illustrate the same apparatus in the same manner, but in a condition at the end of the forming-in process, thus in a condition, in which the brake disc chamber blank is reshaped into the brake disc chamber.

The apparatus 30 serves for creating a composite brake disc 20 (see FIG. 4) from a friction ring or friction ring 3 that includes an inner profiling which for example is designed as an inner toothing 2, and of a brake disc chamber blank 1a (FIGS. 1, 2), which in the course of the method is reworked, reshaped into a brake disc chamber 1 by means of the apparatus 30. The brake disc chamber blank 1a and also the brake disc chamber 1 have a tubular section 1r and a base part 1t, which is adjacent thereto and which can have an angled region (FIGS. 1 and 3) and be provided with openings (FIGS. 1 to 4).

The friction ring 3 can of course have a more complicated construction than in the figures, which are to be understood more as basic sketches, e.g. it can have a more complicated, for example asymmetrical profile and be a friction ring ventilated from the inside.

The brake disc chamber blank 1a is formed into the inner toothing 2 in a multitude of embossing steps carried out by means of an embossing tool 7. The brake disc chamber blank 1a can have a non-profiled, cylindrical tubular section 1r, as illustrated in FIGS. 1 and 2, at the beginning of the method.

The embossing tool 7 has an active region 7a, by means of which the tubular section 1r can be machined in a periodically hammering manner from the inside. The brake disc chamber blank 1a is plastically formed or reshaped in the region of tooth roots 2f of the inner toothing 2, so that there it obtains radially outwardly projecting profile protrusions or teeth. The embossing tool 7 is held in a tool holder 5 of the apparatus 30.

Typically, the brake disc chamber blank 1a is machined in turn in all tooth gap regions 2f of the inner toothing 2, wherein this can also take place in several consecutive revolutions of the workpiece (friction ring with inserted brake disc chamber blank), so that finally each region of the brake disc chamber blank 1a which is adjacent a tooth gap region 2f is machined several times by means of the embossing tool 2. The forming into different regions (tooth gap region 2f) along the periphery of the inner toothing on the one hand is broken up into several part-steps carried out successively, but on the other hand the forming (by way of local reshaping) into each such region is broken up into several part-steps carried out successively, in this manner.

The method is e.g. carried out as follows:

The brake disc chamber blank 1a is introduced into the friction ring 3, for which an introduction device can be used as the case may be, which can be part of the apparatus 30. A robot can serve as an introduction device for example or also as a part of this.

A workpiece holder (not shown in the figures) holds the friction ring 3 with the brake disc chamber blank 1a introduced therein (which together form the workpiece), for which two holders, one for the friction ring 3 and a further one for the brake disc chamber blank 1a can be provided as the case may be.

The held or mounted workpiece is then moved in along the axis 4, until a target position is reached, in which a suitable position of the embossing tool 7 (or more precisely its active region 7a) relative to the inner toothing 2 is present. Generally, the active region 7a is then extended parallel to the axis 4 in a manner such that it extends parallel to the axis 4 at least over the complete extension of the inner toothing 2, in particular such that the active region still has an excess length or overhang at both ends of the inner toothing 2.

The friction ring 3 and the tool holder (and/or the embossing tool 7) can be precisely aligned to one another with regard to rotation, with the help of a position-determining unit (or at least with the help of data or signals, which this can output), wherein this is not represented in the figures. For this, the position-determining unit for example can include an optical or a mechanical sensor, by means of which the rotatory alignment of the inner toothing 2, for example relative to a reference, for example to a rotatory alignment of the embossing tool 7, can be determined. Accordingly, the workpiece or at least a friction ring 3, by means of a suitable drive for the rotation of the workpiece holder, can then be brought into a suitable initial position, in which the inner profiling 2 and the active region 7a are aligned to one another in a suitable manner.

The workpiece can be rotated about the axis 4 with a varying rotation speed, e.g. in an intermittent manner, as is illustrated in FIGS. 2 and 4 by the dashed arrows, by means of the drive for the rotation of the workpiece holder. The rotation axis of the workpiece rotation and the rotation axis of the composite brake disc, which is to be created and which also corresponds to the axis of the friction ring and to the axis of the inner profiling, coincide in the axis 4. The embossing tool 7 simultaneously executes an oscillating radial movement, as is illustrated in FIGS. 1 and 3 by the double-sided arrows. The tool holder 5, which is led in a guide or guide rail 8, for example can be moved to and fro in the radial direction (thus perpendicular to the axis 4) for example by means of an eccentric drive 11 for this. The guide 8 can be provided in a sliding carriage 10, which is likewise mounted in a radially movable manner on a guide rail 12 or a machine frame of the apparatus 30.

The radially oscillating movement of the embossing tool 7 is synchronised with the rotation movement of the workpiece holder, thus with the rotation movement of the friction ring 3 with the introduced brake disc chamber blank 1a. A synchronisation device, which is not represented in the figures, can be provided for this, and function for example in an electronic or mechanical manner. In particular, the frequency and phase of the radially oscillating movement of the embossing tool 7 (relative to the frequency and phase of the workpiece rotation) can be selected such that the embossing tool is maximally radially deflected, thus can be in engagement with the workpiece, at those times, in which the rotation movement of the workpiece is minimal or the workpiece stands still. The workpiece after each such embossing step can for example be rotated further to such an extent, that the next engagement can take place in the region of the next, thus of the adjacent tooth gap.

The active region 7a can be designed such that the region, in which this comes into contact with the brake disc chamber blank 1a, overlaps the inner toothing at least at the end of the forming-in process, thus at least for the respective last engagement into the profile gaps, for engagements at adjacent profile gaps. Radially inwardly projecting burrs can be avoided in this manner.

Thus local cold forming (reshaping) steps can take place locally over the complete periphery of the inner toothing 2, for forming the brake disc chamber 1a into each tooth gap of the inner toothing 2.

As already mentioned above, it can be further useful not only to carry out a single embossing step per tooth gap, but several. A radial feed movement can be provided for this, which is realised by a radial movement of the sliding carriage 10 (radially outwards), as is illustrated in FIGS. 1 and 3 by the simple arrow. The feed movement can be effected e.g. in a continuous manner or as the case may be also in a stepwise manner.

Thus the brake disc chamber blank 1a as a whole, but also locally, e.g. at each tooth gap of the inner profiling 2, can be formed further and further into the inner profiling 2, by way of a forming-in process, which is divided into several part-steps, in particular embossing steps. However, it can also be sufficient not to provide more, thus only a single embossing step per tooth gap and thus e.g. to accomplish the forming of the brake disc chamber blank into the friction ring in a single revolution of the workpiece rotation.

One can recognise in FIG. 4 that the brake disc chamber 1, which has arisen from the brake disc chamber blank 1a by way of the multitude of embossing steps, is formed into the inner toothing 2.

Since the reshaping of the brake disc chamber blank 1a for forming into the inner profiling of the friction ring 3 is effected essentially only in the radial direction, the axial length of the brake disc chamber blank or of the brake disc chamber remains at least essentially unchanged. If at all, only a slight extension of the brake disc chamber blank or the brake disc chamber in the axial direction arises when forming in.

FIG. 5 is a schematised illustration of a detail of an apparatus 30 at the end of the method, in a section parallel to the rotation axis of the composite brake disc and the rotation axis of the workpiece rotation. The apparatus can e.g. be an apparatus 30 as is described in FIGS. 1 to 4. FIGS. 5A and 5B are schematised illustrations of details of the apparatus of FIG. 5, in a section perpendicular to the axis, and in FIG. 5 the sections are characterised by the arrow and "A" and "B" respectively.

The procedure is precisely analogous with regard to FIGS. 6, 6A and 6B as well as FIGS. 7, 7A and 7B.

A condition during the engagement of the embossing tool 7 into the workpiece (including a friction ring 3 and brake disc chamber blank 1a or, at the end of the method, the brake disc chamber 1) is illustrated in each case.

One can recognise in FIG. 5 that the active region 7a, parallel to the axis 4 (running perpendicularly in FIG. 5, but not represented) extends on both sides beyond the (likewise axis-parallel) extension of the inner toothing 2. The (axial) ends of the inner toothing are indicated at 2a, 2b in FIG. 5.

Given a suitable selection of the method parameters or reshaping parameters, one can succeed in projections 1x of the brake disc chamber 1 also yet being simultaneously produced at the ends 2a, 2b of the inner toothing 2, by way of the forming of the brake disc chamber blank 1a into the inner toothing 2, in this manner. These projections 1x project radially outwards. They radially project beyond those regions of the brake disc chamber 1, in which the brake disc chamber 1 is formed into the inner toothing 2.

Projections 1x can serve as axial stops. A sliding of the brake disc chamber 1 out of the friction ring 3 (in the axial direction) can be prevented by them. This effect can also be retained given different thermal expansions or mechanical loading of the friction ring 3 and brake disc chamber 1, as can be present with braking procedures.

The brake disc chamber 1 can encompass the friction ring 3 over its whole periphery close to the inner toothing 2 by means of the projections 1x. This can be the case continuously or at a plurality of locations distributed over the periphery of the inner toothing 2.

The projections 1x, as is evident from FIG. 5B, can be designed in an annular manner. Two such ring-like projections 1x can in particular be present and these are each arranged at an axial end of the inner toothing 2.

A projection 1x (typically two projections 1x) for example can form an annular structure, by means of which a line is reproduced, the line being described by the shape of the inner toothing 2 at an end-face 3f of the friction ring 3.

As is evident from FIG. 5B, this reproduction can be of a nature such that the annular structure is displaced radially outwards with respect to the mentioned line.

One can also envisage the projections 1x forming a structure, which is present in sections along a ring, and by means of which sections of a line are reproduced, the line being described by the shape of the inner toothing 2 at an end-face 3f of the friction ring 3f, but this is not shown in the drawings. This for example can be the case if the method or reshaping parameters and in particular a profile of the embossing tool 7 are selected such that projections 1x are only produced in the region of tooth tips 2k of the inner toothing 2, but not on the tooth roots 2f of the inner toothing 2, or the other way round, if the method or reshaping parameters and in particular a profile of the embossing tool 7 are selected that projections 1x are only produced in the region of tooth roots 2f of the inner toothing 2 but not on tooth tips 2k of the inner toothing 2. In such a case, the effect of the projections as an axial stop is achieved on a plurality of projections 1x typically distributed uniformly over the periphery of the inner toothing 2. In this case, in particular just as many projections 1x can be present per structure as the inner profiling has teeth (or tooth gaps).

As is indicated in FIG. 5A, the forming of the brake disc chamber blank 1a into the inner toothing can be effected such that a gap remains between the brake disc chamber 1 and the friction ring 3, in the region of the tooth gaps or tooth roots 2f.

As is to be recognised from FIGS. 5 and 5B, the projections 1x are designed in a bulge-like or bulge-shaped manner. In particular, they include regions, specifically where they do not bear on the friction ring 3, close to the ends 2a 2b of the inner toothing 2, in which regions their shape is determined by free material flow. They are integrally formed on the respective surface, where the projections 1x are in contact with an end-face 3f of the friction ring 3 that delimits the inner toothing 2.

As a whole, one can determine whether and how much radial play should be present, and inasmuch as is desired, how large a preload between the brake disc chamber 1 and the friction ring 3 should be, by way of a suitable choice of the method parameters or, more precisely, of the reshaping parameters such as feed depth and the shape of the active region 7a. These characteristics can be controlled and reproduced very well in the described method.

As is illustrated in FIG. 5, the projections 1x can be produced for example with an embossing tool 7 that includes an active region 7a with the shape of a rib, in particular of a rib that runs parallel to the axis 4 and has a constant profile parallel to the axis 4.

FIGS. 6, 6A, 6B illustrate a possibility of producing particularly greatly pronounced projections 1x. In this case, an embossing tool 7 is applied with an active region 7a that includes projections 7b. The projections 7b project radially outwards and are arranged in regions that lie at the ends (2a, 2b) and/or outside the axial extension of the inner toothing.

Material of the brake disc chamber blank 1a can be displaced radially outwards to a particularly far extent by means of these projections 7b, so that the projections 1x project radially outwards particularly far beyond the ends 2a, 2b of the inner toothing 2, see also FIGS. 6 and 6B.

It is illustrated in FIGS. 7, 7A and 7B that it is possible to produce axial stops by means of projections 1x alternatively or (as illustrated) additionally, between the ends 2a, 2b of the inner toothing 2, during the forming of the brake disc chamber blank 1a into the inner toothing 2 of the friction ring 3.

For example, a groove 3x or a recess can be provided in the friction ring 3, more precisely in the inner toothing 2, into which the material of the brake disc chamber blank 1a can be displaced. Thus one or more projections 1x can be produced by the embossing steps depending on the shape and width of such a groove 3x or recess and their number, and these projections can serve as an axial stop as described above. Recesses or corresponding surfaces, together with which the projections 1x interact as axial stops, can extend over the whole periphery of the friction ring 3 or over parts thereof, and in particular they can be provided on a plurality of locations that are distributed (typically uniformly) over the periphery of the friction ring, e.g. by means of a groove being provided every 20°.

The surfaces of the groove 3x represented in FIG. 7, with which the middle projection 1x interacts, are aligned parallel to an axis-perpendicular plane and (in each case locally) form a right angle to a tangent to the periphery of the inner toothing 2. However, it is also possible (not shown in FIG. 7) to provide differently aligned as well as differently shaped grooves, e.g. a groove can include surfaces which (in each case locally) enclose an acute or obtuse angle with a tangent to the periphery of the inner toothing.

FIGS. 8A to 11 relate to design possibilities for the inner profiling.

In order to disturb the material flow as little as possible on forming the brake disc chamber blank into the inner profiling of the friction ring, an edge-free profile shape can be provided, as is represented in the figures (at least in a section perpendicular to the axis of the composite brake disc).

As already mentioned further above, a play-free and firm fit between the friction ring and the brake disc chamber is achieved due to the provision of a preload. As is explained hereinafter, the shape of the inner profiling can contribute to a firm fit between the friction ring and the brake disc chamber.

FIG. 8A schematically shows an illustration of a detail of friction ring 3 with a brake disc chamber 1 which is formed in, in a section perpendicular to the axis of the composite brake disc. In the case of a profile shape as that shown in FIG. 8A, an undesired play between the friction ring 3 and the brake disc chamber 1 can occur given a large heating of the friction ring 3, thus for example with a braking procedure, amongst other things because the thermal contact between the friction ring 3 and the brake disc chamber 1 is not good. A consequence can be an insufficient centring of the brake disc chamber 1 in the friction ring 3.

FIG. 8B shows a principle illustration of the detail according to FIG. 8A, with a heated friction ring 3. The mentioned play is evident in FIG. 8B.

The mentioned play can be kept low or be avoided completely and this indeed even in the case of a heated friction ring 3, due to a suitable design of the inner profiling 2. A flank angle $\alpha$ is drawn in FIG. 8A and this in the illustrated example is 21°. The flank angle $\alpha$ is formed between a tangent to the flank of the inner profiling (in an inflection point; or as the case may be in an inflection point region), represented by a dotted line, and that radial axis, which runs centrally through the adjacent profile gap, is represented by a dashed line. (A radial axis is an axis that runs through the axis of the composite brake disc and lies in a plane perpendicular to the rotation axis of the composite brake disc).

The play, which is present at most in the case of braking, becomes smaller (or disappears) with a reducing flank angle $\alpha$. This for example is also evident from the case $\alpha=0°$ described below.

FIG. 9 shows an illustration of a detail of a friction ring 3 with a formed-in brake disc chamber 1, in a section perpendicular to the axis, wherein in this case the flank angle α is less than 0°. In the example of FIG. 9, it is about −5.5° (cf. the positive angle in the case of FIG. 8A). Here, one can speak of an inflection point region, since the flanks in the illustrated case are straight over a certain stretch. The dotted line runs along the inflection point region. The profile projections or teeth of the inner profiling or, more precisely the flanks, have regions that are parallel to one another, in the case of FIG. 9. For this reason however, the profile gaps have a waist tL, so that the brake disc chamber is held in the profile gaps. A positive-fit connection between the respective region of the brake disc chamber and the respective region of the friction ring is present in this manner, in the region of each individual, accordingly designed profile gap.

A sliding of the brake disc chamber profile section out of such a profile gap of the inner profiling in the radial direction necessitates a force effort for a deformation of this. A stable retention can thus be achieved.

The flanks include at least one region, in which the distance of the flank to the previously mentioned radial axis (dashed line in FIG. 9) increases with an increasing distance to the rotation axis. This is not the case in the case of FIG. 8A. There, the distance of the flank to the mentioned central radial axis (dashed line in FIG. 8A) reduces with an increasing distance to the rotation axis, so that no deformation work needs to be applied against a sliding of the brake disc chamber profile section out of such a profile gap of the inner profiling in the radial direction, and a positive connection is neither present in the region of individual profile gaps.

A good fit between the friction ring and the brake disc chamber with a negligent or at least low play, even in the case of braking results not only for negative flank angles α, but also already for α=0°. The play between the friction ring and the brake disc chamber (also in the case of braking) can also be sufficiently small also for flank angles up to α=10° or at least α=5°.

A particularly secure fit between the friction ring and the brake disc chamber can be achieved if (on account of the respective design of the inner profiling of the friction ring) not only radially outwardly projecting brake disc chamber profile sections are held in the inner profiling (see e.g. FIG. 9), but also yet profile projections (or teeth) of the inner profiling are held in radially inwardly bulging brake disc chamber profile sections. In such a case, the inner profiling includes waisted profile projections (or teeth). In this manner, a positive connection between the respective region of the brake disc chamber and the respective region of the friction ring is not only present in the region of each individual accordingly designed profile gap, but also in the region of each individual, accordingly designed profile projection (or tooth).

FIG. 10 is an illustration of a detail of a friction ring 3 with a formed-in brake disc chamber 1 with a profile gap, which includes a waist tL, in a section perpendicular to the axis. Moreover, the adjacent profile projection or profile tooth also has a waist tZ in the example of FIG. 10.

A play-free fit between the friction ring and the brake disc chamber and one which is particularly stable with regard to thermal effects can be achieved in this manner. In such a case, there are flank regions with a negative flank angle α and at least one point (or, in corresponding embodiment examples, as the case may be, also a region) with α=0°.

Only inner profilings with symmetrical profile gaps (and corresponding symmetrical profile projections or teeth) are represented in the FIGS. 8A to 10. Thereby, the symmetry in particular relates to a symmetry in a section plane, which is perpendicular to the rotation axis of the composite brake disc, with respect to a central through the respective profile gap or central through the respective profile projection.

A corresponding symmetry can be given, but does not need to be present. It can be sufficient for the effects with regard to an improved fit between the friction ring and the brake disc chamber or its improved behaviour on heating the friction ring, the effects discussed in the context of FIGS. 8A to 10, if only one of the two flanks of a profile gap has one of the characteristics discussed in the context of FIGS. 8A to 10.

FIG. 11 shows an illustration of a detail of a friction ring 3 given an asymmetrical profile gap, in a section perpendicular to the axis. A formed-in brake disc chamber is not shown in FIG. 11. In the represented case, the flank, which is arranged at the left in FIG. 11, has a flank angle of α=10°. And the flank, which is represented on the right, has a waist tL of the profile gap as well as a waist tZ of the adjacent profile projection.

In particular, in cases, in which only one of the two flanks of a profile has one of the characteristics discussed in the context of FIGS. 8A to 10, but also in the case of other asymmetrical profilings, it can be advantageous for the fit if yet profile gaps are also provided, whose profile shape results from the mirroring at the respective central radial axis. The non-mirrored and the mirrored profile shapes can be provided along the periphery in an alternatingly manner.

The effects of waisted product gaps, which are outlined above, result at least partly due to the fact that material of the brake disc chamber blank is brought up to the flanks, see FIGS. 9 and 10 on forming into the inner profiling. With the simultaneous presence of a waist tZ, see FIG. 10, material of the brake disc chamber blank on forming in can even be brought into the respective waist of the adjacent profile gap. Embossing tools with conical (non-waisted) active regions can be used for this. A corresponding selection of method parameters can permit such material flows. Accordingly, bulging profilings of the brake disc chamber can be created, as are represented for example in FIGS. 9 and 10.

Composite brake discs of a high quality with selectable characteristics can be created in an economical manner by means of the described method and the described apparatus. The composite brake discs can be applied for wheels and in different vehicles, in particular in motor vehicles, for example in cars.

The invention claimed is:

1. A method for manufacturing a composite brake disc comprising the steps of:
   providing a friction ring having an inner profiling,
   providing a brake disc chamber blank,
   providing an embossing tool;
   introducing the brake disc chamber blank into the friction ring so that the inner profiling faces an outer surface of the brake disc chamber blank;
   rotating the friction ring together with the brake disc chamber blank about a common rotation axis, said rotation of the friction ring and the brake disc chamber blank having a temporally varying rotation speed,
   moving the embossing tool in oscillating movements in a direction perpendicular to the common rotation axis and synchronized with the rotation of the friction ring and brake disc chamber blank into engagement with the brake disc chamber blank so that the at least one embossing tool repeatedly embosses the brake disc chamber blank, thereby forming the brake disc chamber blank into the inner profiling of the friction ring.

2. The method according to claim 1, wherein forming the brake disc chamber blank into the inner profiling of the friction ring comprises a successive implementation of a plurality of embossing steps in a region of different profile gaps of the inner profiling.

3. The method according to claim 1, wherein forming the brake disc chamber blank into the inner profiling of the friction ring comprises at least two embossing steps in a region of each tooth gap of the inner profiling.

4. The method according to claim 1, wherein the embossing tool embosses the brake disc chamber blank in phases of the rotation in which the friction ring and the brake disc chamber blank are at least momentarily stationary.

5. The method according to claim 1, wherein the step of providing the brake disc chamber blank includes providing a non-profiled brake disc chamber blank.

6. The method according to claim 1, wherein the inner profiling comprises profile gaps, which are waisted and/or are delimited in each case by at least one profile flank having a section or location running parallel within 10° to a radial axis running centrally through the respective profile gap.

7. The method according to claim 1, wherein at least one outwardly directed projection for a mutual axial fixation of the friction ring and brake disc chamber is formed on the brake disc chamber by the embossing tool during the step of forming.

8. The method according to claim 7, wherein the at least one outwardly directed projection is produced by reshaping of the brake disc chamber blank effected by the repeated embossing during which the brake disc chamber blank is formed into the inner profiling of the friction ring.

9. The method according to claim 1, wherein at least two outwardly directed projections for mutual axial fixation of the friction ring and brake disc chamber are formed on the brake disc chamber by the embossing tool during the repeated embossing during which the brake disc chamber blank is formed into the inner profiling of the friction ring, and wherein at least one of the projections is formed on a first axial end of the inner profiling, and at least one other of the projections is formed on a second axial end of the inner profiling.

10. An apparatus for manufacturing a composite brake disc comprising a brake disc chamber and a friction ring having an inner profiling, wherein the brake disc chamber is producible by reshaping a brake disc chamber blank, and the brake disc chamber blank has a tubular section, wherein the apparatus comprises:
 a workpiece holder rotatable about a longitudinal axis, said workpiece holder serving to hold the friction ring into which the brake disc chamber blank is introduced, so that the tubular section of the brake disc chamber blank is located within the inner profiling so that an inner side of the tubular section can be engaged;
 a drive for rotating the workpiece holder, said drive being configured to produce a rotation with a temporally varying rotation speed;
 a tool holder for holding an embossing tool, said tool holder being drivable for carrying out a linearly oscillating movement in a direction perpendicular to the longitudinal axis, so that an inner side of the tubular section can be repeatedly embossed by the embossing tool;
 a synchronization device for synchronizing rotation of the workpiece holder with the linearly oscillating movement of the tool holder.

11. The apparatus according to claim 10, further comprising a position-determining unit for determining a relative rotatory positioning of the friction ring and the tool holder or of the friction ring and the embossing tool.

12. The apparatus according to claim 10, further comprising an introduction device for introducing the brake disc chamber blank into the friction ring.

13. A method for manufacturing a composite brake disc, comprising the steps of:
 providing a friction ring having an inner profiling;
 providing a brake disc chamber blank;
 providing an embossing tool;
 providing an apparatus, said apparatus comprising:
 a workpiece holder rotatable about a longitudinal axis, said workpiece holder serving to hold the friction ring into which the brake disc chamber blank is introduced, so that the tubular section of the brake disc chamber blank is located within the inner profiling so that an inner side of the tubular section can be engaged with the embossing tool;
 a drive for rotating the workpiece holder, said drive being configured to produce a rotation with a temporally varying rotation speed;
 a tool holder for holding an embossing tool, said tool holder being drivable for carrying out a linearly oscillating movement in a direction perpendicular to the longitudinal axis, so that an inner side of the tubular section can be repeatedly engaged by the embossing tool;
 a synchronization device for synchronizing rotation of the workpiece holder with the linearly oscillating movement of the tool holder;
 introducing the brake disc chamber blank into the friction ring so that the inner profiling faces an outer surface of the brake disc chamber blank;
 moving the embossing tool into engagement with the brake disc chamber blank; and
 forming the brake disc chamber blank into the inner profiling of the friction ring.

* * * * *